3,342,845
TERPHENYL TRIISOCYANATES
Adnan A. R. Sayigh, North Haven, Conn., assignor to The Upjohn Company, Kalamazoo, Mich., a corporation of Delaware
No Drawing. Filed Nov. 5, 1964, Ser. No. 409,269
6 Claims. (Cl. 260—453)

This invention relates to novel polyisocyanates and, more particularly, to novel terphenyl triisocyanates and to processes for their preparation, and to polyurethane compositions produced therefrom.

The novel triisocyanates of the invention can be represented by the following formula:

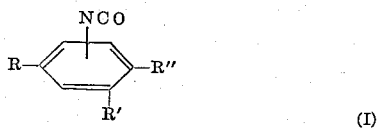

(I)

wherein R represents a member selected from the group consisting of o-isocyanatophenyl and p-isocyanatophenyl, one of the groups R' and R" represents hydrogen and the other of the groups R' and R" represents a member selected from the group consisting of o-isocyanatophenyl and p-isocyanatophenyl.

The novel compounds of the above Formula I are useful as intermediates in a variety of syntheses. For example, the compounds of the invention can be employed in the preparation of polyurethanes by reaction with active hydrogen containing materials in accordance with processes known in the art. In particular, the compounds of Formula I are useful in the preparation of rigid polyurethane foams and possess advantages over known polyisocyanates hitherto used for this purpose as discussed more fully below.

The novel compounds of the invention having the Formula I above can be produced by phosgenation, using processes known in the art, of the corresponding triamino compounds. The phosgenation is carried out advantageously using the procedures described by Siefken, Annalen 562, 75 et seq. (1949). Illustratively, the free triamine or an acid addition salt thereof, such as trihydrochloride, trihydrobromide, and the like, is treated with phosgene in the presence of an inert organic solvent such as benzene, toluene, xylene, naphthalene, decalin, chlorobenzene, o-dichlorobenzene, bromobenzene, o-chlorotoluene and the like. The reaction is conducted advantageously at elevated temperatures and preferably at temperatures of the order of 150° C. to 200° C. The phosgene is conveniently employed in approximately stoichiometric proportions but an excess of phosgene can be employed if desired.

The triamino compounds, employed as starting materials in the preparation of the triisocyanates (I) of the invention, are themselves prepared by reduction of the corresponding trinitro compounds using procedures well known in the art for the reduction of aromatic nitro compounds to the corresponding amines. For example, the reduction can be accomplished by hydrogenation in the presence of an hydrogenation catalyst such as Raney nickel, platinum oxide, palladium-on-charcoal and the like. Alternatively, the reduction can be accomplished using stannous chloride in the presence of hydrochloric acid, zinc dust in the presence of hydrochloric acid, and like procedures.

The triamino compounds employed as intermediates in the preparation of the compounds (I) of the invention can be represented by following formula:

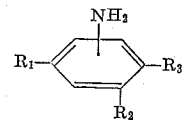

wherein $R_1$ represents o- or p-aminophenyl, one of the groups $R_2$ and $R_3$ represents hydrogen and the other represents o- or p-aminophenyl. These triamino compounds, in addition to their usefulness in the preparation of the compounds (I) above are also useful, in accordance with U.S. Patents 1,915,334 and 2,075,359 in forming amine fluosilicate mothproofing agents, and, in accordance with U.S. Patents 2,425,320 and 2,606,155 in forming amine thiocyanate formaldehyde condensation products for use as pickling inhibitors.

The trinitro compounds which are employed as starting materials for the preparation of the above triamino compounds are themselves prepared by nitration of the appropriate terphenyl using procedures such as those described by Gray and Lewis, Journal of the Chemical Society, 1961, 1069, and France et al., ibid.,1939, 1228. The nitration is normally accomplished using fuming nitric acid in the presence of glacial acetic acid. This method frequently gives a mixture of trinitro compounds and such mixtures can be separated by procedures known in the art such as chromatography, counter-current distribution, fractional crystallization and the like.

As stated above the triisocyanates of Formula I above are useful in the preparation of polyurethanes and, in particular of rigid foams. Such polyurethanes are prepared by procedures known in the art; see for example, Saunders et al., Polyurethanes, part I, Interscience Publishers, New York, 1962. In procedures for the preparation of foams the polyisocyanate is reacted with a polyol and with water, if necessary in the presence of catalysts, surface active agents, and other auxiliary agents, whereby simultaneous reaction between isocyanate, water, and polyol occurs to give the foam product. This is the "one-shot" procedure. Alternatively the polyol can be reacted with excess isocyanate to give an isocyanate-terminated prepolymer which is then reacted with water, if desired in the presence of the auxiliary agents mentioned above, to give the foam.

Any of the prior art polyols conventionally employed in the preparation of foams, can be employed in the preparation of foams using the triisocyanates (I). Illustrative polyols are polyethers such as polyoxyalkylene glycols, for example, the polyoxyethylene glycols prepared by the addition of ethylene oxide to water, ethylene glycols or diethylene glycol; polyoxypropylene glycols prepared by the addition of 1,2-propylene oxide to water, propylene glycol or dipropylene glycol; mixed oxyethyleneoxypropylene polyglycols prepared in a similar manner utilizing a mixture of ethylene oxide and propylene oxide or a sequential addition of ethylene oxide and 1,2-propylene oxide; polyether glycols prepared by reacting ethylene glycol, propylene oxide or mixtures thereof with mono- and polynuclear dihydroxy benzenes, e.g., catechol, resorcinol, hydroquinone, orcinol, 2,2-bis(p-hydroxyphenyl) propane, bis(p-hydroxyphenyl)methane, and the like; polyethers prepared by reacting ethylene oxide, propylene oxide, or mixtures thereof with aliphatic polyols such as glycerol, sorbitol, trimethylolpropane, 1,2,6-hexanetriol, pentaerythritol, sucrose or glycosides, e.g. methyl, ethyl, propyl, butyl, and 2-ethylhexyl arabinoside, xyloside, fructoside, glucoside, rhamnoside, etc.; polyethers prepared by reacting ethylene oxide, propylene oxide or mixtures thereof with alicyclic polyols such as tetramethylolcyclohexanol; polyols containing a heterocyclic nucleus such as 3,3,5-tris(hydroxymethyl)-5-methyl-4-hydroxytetrahydropyran and 3,3,5,5-tetrakis(hydroxymethyl)-4-hydroxytetrahydropyran; or polyols containing an aromatic nucleus such as 2,2-bis(hydroxyphenyl)ethanol, pyrogallol, phloroglucinol, tris(hydroxyphenyl)alkanes, e.g., 1,1,3-tris(hydroxyphenyl)ethanes, and 1,1,3-tris(hydroxyphenyl)propanes, etc., tetrakis(hydroxyphenyl)alkanes, e.g., 1,1,3,3-tetrakis(hydroxy-3-methylphenyl)propanes, 1,1,4,4-tetrakis(hydroxyphenyl)butanes, and the like.

A particularly useful polyol is a polyol mixture comprising a polyol adduct produced by mixing under hydroxyalkylation conditions from 2 to 20 molecular equivalents of ethylene oxide, propylene oxide, or 1,2-butylene oxide, or mixtures thereof, and one amine equivalent of a polyamine mixture, 100 parts of said polyamine mixture containing from 35 to 90 parts of methylene dianilines, the remaining parts being triamines and polyamines of higher molecular weight, said methylenedianilines, triamines, and polyamines of higher molecular weight having molecular weight having been formed by acid condensation of aniline and formaldehyde. Such polyols are available commercially from The Upjohn Company, Carwin Organic Chemicals Division under the trade name Carwinols in various equivalent weight ranges.

Illustrative of the polyester polyols which can be employed in preparing polyurethanes from the triisocyanates (I) are those prepared from dibasic carboxylic acids and polyhydric alcohols, preferably trihydric alcohols. The dibasic carboxylic acids useful in preparing the polyesters have no functional groups containing active hydrogen atoms other than their carboxylic acid groups. They are preferably saturated. Acids such as phthalic acid, terephthalic acid, isophthalic acid, succinic acid, glutaric acid, adipic acid, and pimelic acid are suitable. Anhydrides of these acids may be used also. The polyol component or components of the polyester are preferably trihydric. Examples of suitable polyols include trimethylolethane, trimethylolpropane, mannitol, hexanetriol, glycerine, and pentaerythritol. Small amounts of dihydric alcohols such as ethylene glycol, diethylene glycol, 1,2-propylene glycol, 1,4-butanediol, and cyclohexanediol may also be used. In order that the resulting polyurethane foam be sufficiently rigid, it is recommended that no more than about 20% of the hydroxyl groups of the polyester used be supplied by a diol.

It is advantageous to add a hydroxyl terminated crosslinking polyol to the foam reaction mixture to form the best network for foam formation. Advantageously the crosslinking polyol should have at least 3 hydroxy groups in the molecule and can be added to the foam reaction mix at any point at which the other polyols are added. Examples of such crosslinking polyols are trimethylolpropane, glycerol, 1,2,6-hexanetriol, pentaerythritol, hydroxyalkylated aliphatic diamines such as N,N,N'N'-tetrakis(2 - hydroxypropyl)ethylenediamine, N,N,N',N'-tetrakis(2-hydroxyethyl)ethylenediamine, and the like, and alkylene oxide reaction products of sugars such as sucrose, and the like.

The proportions of isocyanate to polyol employed in the foam mixtures according to the process of the invention are within the normal limits employed in the production of rigid polyurethane foams. Thus the ratio of isocyanate to active hydrogen groups is within the range of from 1.50:1 to 0.65:1 and preferably within the range of 1.10:1 to 1:1, whether the isocyanate and polyol are employed separately in the one-shot process or whether the two components have been reacted to form a prepolymer. The lower ranges of isocyanate to hydroxyl group ratio are used where the polyol is highly functional.

The final foam density of the products produced as described above can be controlled in accordance with methods well-known in the art. For example, this control can be accomplished by regulating the amount of water present in the foam mixture or by using a combination of water and a conventional blowing agent having a boiling point below about 110° C. and preferably below about 50° C. such as a volatile aliphatic hydrocarbon or a volatile highly halogenated hydrocarbon, for example, trichloromonofluoromethane, dichlorodifluoromethane, chlorotrifluoromethane, 1,2-dichloro-1-fluoroethane, 1-chloro-1,1-difluoro-2,2-dichloroethane and 1,1,1-trifluoro-2-chloro-2-fluorobutane or mixtures thereof.

Optional additives such as dispersing agents, cell stabilizers, surfactants, flame retardants, and the like which are commonly employed in the fabrication of rigid polyurethane foams, can be employed in producing foams from the triisocyanates (I). Thus a finer cell structure can be obtained if water-soluble organosilicone polymers are used as surfactants. Organosilicone polymers obtained by condensing a polyalkoxy polysilane with the monoether of a polyalkyleneether glycol in the presence of an acid catalyst are representative of those surfactants which can be used for this purpose. The organosilicone copolymer available from Union Carbide Corporation under the trade name L-5320 is typical of such polymers. Other surfactants such as ethylene oxide modified sorbitan monopalmitate or ethylene oxide modified polypropyleneether glycol may be used if desired, to obtain better dispersion of the components of the foam mixture.

Illustrative of the flame retardants which can be used in the foams of the invention are the highly halogenated organophosphorus compounds such as tris-(2,3-dibromopropyl) phosphate, supplied by Michigan Chemical Corporation under the name "Firemaster" T23P, and the series of chloroethylated phosphorus derivatives available under the generic name of phosgards from Monsanto Chemical Company.

A particularly advantageous method of increasing the fire retardant properties of the compounds produced by the process of the invention is to replace part of the polyol employed in preparing the foams described above by a phosphorus-containing polyol such as the products available commercially under the trade names FR–P8 (The Upjohn Company, Carwin Organic Chemicals Division), Vircol 82 and Vircol 638 (Virginia Carolina Chemical Corporation) and Fyrol 6 (Victor Chemical Company).

Other additives such as dyes, pigments, soaps and metallic powders and other inert fillers may be added to the foam mixture to obtain special foam properties in accordance with practices well known in the art.

Any of the triisocyanates (I) can be employed in the preparation of polyurethanes as described above. The isocyanates can be employed individually or mixtures of two or more triisocyanates (I) can be used. Such mixtures can be prepared by admixture of the individual triisocyanates or, in accordance with a particular aspect of the invention, such mixtures can be prepared by nitrating meta or para-terphenyl as described above to yield a mixture of trinitroterphenyls which mixture is reduced, without separating the components therein, to the corresponding mixture of triamines and the latter, also without separation of the components, is phosgenated in accordance with procedures described above. Mixtures of triisocyanates produced in this manner enjoy the advantage of being liquid at normal operating temperatures employed in the preparation of polyurethanes.

The triisocyanates of Formua I possess advantages over known polyisocyanates having comparably high functionality in that they give rigid polyurethane foams having higher strength and greater color stability. The polyisocyanates having a functionality greater than two currently available are those prepared by phosgenating the polyamines obtained by condensing formaldehyde and aniline in the presence of hydrochloric acid using procedures such as that described by Seeger, U.S. Patent 2,683,730. The polyisocyanates prepared in this way are normally mixtures of compounds having various molecular weights and rigid control of reaction conditions is necessary to obtain products having the required composition. Further, these polyisocyanates contain benzene nuclei linked together by methylene groups which are susceptible to reactions resulting in discolorization of the polyurethane containing them. The triisocyanates of Formula I above do not suffer from these disadvantages in that they are single chemical entities of uniform molecular weight and yield rigid polyurethane foams of high strength and enhanced color stability.

The following examples describe the manner and process of making and using the invention and set forth the best mode contemplated by the inventors of carrying out the invention but are not to be construed as limiting.

EXAMPLE 1

4,4',4''-triisocyanato-meta-terphenyl (A) *Preparation of 4,4',4''-trinitro-meta-terphenyl.*—To a stirred mixture of 100 g. of meta-terphenyl and 500 ml. of glacial acetic acid, 350 ml. of fuming nitric acid (90% $HNO_3$) was added over a period of 80 minutes, while maintaining the temperature at 39–41° C. The solution so obtained was heated on the steam bath for one hour (84° C.) and finally for 20 minutes at 102° C. During this time the solution developed a red color. After cooling to room temperature the mixture was filtered and the nearly white green-tinted solid mixture was washed four times with 100 ml. portions of water. The solid so obtained was dissolved in 1200 ml. of hot acetic acid, filtered to remove a small amount of insoluble material, and the solution allowed to crystallize to obtain 30 grams of yellow-tinted solid, melting at 202–208° C. This material was recrystallised from 1400 ml. of benzene to give 26 grams of 4,4',4''-trinitro-meta-terphenyl in the form of a light yellow solid melting at 206 to 208° C.

(B) *Preparation of 4,4',4''-triamino-meta-terphenyl.*—7.5 grams of the above trinitro terphenyl was mixed with 200 ml. of ethyl acetate containing 6 grams of W–2 Raney nickel [prepared as described by Adkins et al., J. Am. Chem. Soc. 69, 3040 (1947)] in a Paar hydrogenation apparatus. The air in the apparatus was displaced by hydrogen and thereafter hydrogenation was conducted at room temperature (about 25° C.) and at about 16 pounds per square inch pressure. A total of 0.1750 mole of hydrogen was absorbed in a period of one half to one hour. The reaction mixture was filtered to remove catalyst and then anhydrous hydrogen chloride was passed into the filtrate until precipitation of the amine hydrochloride (7.0 g.) was complete. The hydrochloride (10 grams; combined product from identical runs) was taken up in 100 ml. of water containing 1 gram of Norite and a small amount of thiourea. The filtered solution was neutralized with 50% by weight of aqueous sodium hydroxide solution. The solid which separated was isolated by filtration, washed with water and dried to give 4,4',4''-triamino-meta-terphenyl having a melting point of 143 to 147° C.

*Analysis.*—Calculated for $C_{18}H_{17}N_3$: N, 15.27. Found: N, 15.3.

(C) *Preparation of 4,4',4''-triisocyanato-meta-terphenyl.*—A suspension of 38 g. of 4,4',4''-triisocyanato-meta-terphenyl (prepared by neutralising the free triamine prepared as described above with aqueous hydrochloric acid and evaporating the solution to dryness) in 380 ml. of dry o-dichlorobenzene in a three necked round bottom flask equipped with a water-cooled reflux condenser, and was heated at 120–130° C. during which time phosgene was passed into the solution, with stirring, until the solution became clear. Thereafter, dry nitrogen was passed through the solution at 120–130° C. to remove the hydrogen chloride and excess phosgene. The solvent was distilled from the reaction product under reduced pressure to leave a residue of 40 grams (nearly 100% of theory) of 4,4',4''-meta-terphenyl triisocyanate as a viscous liquid.

*Analysis.*—Calculated for $C_{21}H_{11}N_3O_3$: C, 71.4; H, 3.11; N, 11.9. Found: C, 72.51; H, 3.69; N, 11.44.

The isocyanate content of the product was determined as follows:

A 1.970 gram sample of the meta-terphenyl triisocyanate was dissolved in 100 ml. of toluene and 20 ml. of di-n-butylamine was added. The solution was heated to reflux, cooled, 200 ml. of methanol added, and the solution titrated with hydrochloric acid; 23.0 ml. were required. Since the di-n-butylamine used would require 39.9 ml. of 1 N-hydrochloric acid, the results showed that 16.9 ml. of the di-n-butyl amine had been consumed by the triisocyanate. This corresponded to a molecular weight of 350 for the triisocyanate; theoretical value is 353.

The infra red spectrum of the 4,4',4''-triisocyanato-meta-terphenyl obtained as described above showed maxima at 4.45µ (—NCO) and 2.72µ (—NCO); no peak was observed at 4.5µ indicating that each of the phenyl nuclei was at least disubstituted.

A sample of the triisocyanate was converted to the corresponding tri(methylurethane) by reaction with methanol. The infrared spectrum of the methylurethane so obtained showed maxima at 2.95µ (>NH), 5.76µ (>C=O) and 8.2µ (—C—OOC—).

EXAMPLE 2

4,2',4''-triisocyanato-para-terphenyl (A) *Preparation of 4,2',4''-triamino-para-terphenyl trihydrochloride.*—Using the procedure described in Example 1, Part B, but replacing 4,4',4''-trinitro-meta-terphenyl by 4,2',4''-trinitro-para-terphenyl (France et al., J. Chem. Soc. 1938, 1364) there was obtained 4,2',4''-triamino-para-terphenyl which was converted to its trihydrochloride by neutralising the triamine with aqueous hydrochloric acid and evaporating the resulting solution to dryness.

(B) *Preparation of 4,2',4''-triisocyanato-para-terphenyl.*—Using the procedure described in Example 1, Part C, but replacing 4,4',4''-triamino-meta-terphenyl trihydrochloride by 4,2',4''-triamino-para-terphenyl trihydrochloride, there was obtained 4,2',4''-triisocyanato-para-terphenyl.

EXAMPLE 3

2,2',4''-triisocyanato-para-terphenyl (A) *Preparation of 2,2',4''-triamino-para-terphenyl trihydrochloride.*—Using the procedure described in Example 1, Part B, but replacing 4,4',4''-trinitro-meta-terphenyl by 2,2',4''-trinitro-para-terphenyl (Gray and Lewis, J. Chem. Soc. 1961, 1069), there was obtained 2,2',4''-triamino-para-terphenyl which was converted to its trihydrochloride by neutralising the triamine with aqueous hydrochloric acid and evaporating the resulting solution to dryness.

(B) *Preparation of 2,2',4''-triisocyanato-para-terphenyl.*—Using the procedure described in Example 1, Part C, but replacing 4,4',4''-triamino-meta-terphenyl trihydrochloride by 2,2',4''-triamino-para-terphenyl trihydrochloride, there was obtained 2,2',4''-triisocyanato-para-terphenyl.

EXAMPLE 4

2,3',4''-triisocyanato-para-terphenyl (A) *Preparation of 2,3',4''-triamino-para-terphenyl trihydrochloride.*—Using the procedure described in Example 1, Part B, but replacing 4,4',4''-trinitro-meta-terphenyl by 2,3',4''-trinitro-para-terphenyl (Gray and Lewis, ibid.) there was obtained 2,3',4''-triamino-para-terphenyl which was converted to its trihydrochloride by neutralising the triamine with aqueous hydrochloric acid and evaporating the resulting solution to dryness.

(B) *Preparation of 2,3',4''-triisocyanato-para-terphenyl.*—Using the procedure described in Example 1, Part C, but replacing 4,4',4''-triamino-meta-terphenyl trihydrochloride by 2,3',4''-triamino-para-terphenyl trihydrochloride, there was obtained 2,3',4''-triisocyanato-para-terphenyl.

EXAMPLE 5

*2,2',2''-triisocyanato-para-terphenyl*

(A) *Preparation of 2,2',2''-triamino-para-terphenyl trihydrochloride.*—Using the procedure described in Example 1, Part B, but replacing 4,4',4''-trinitro-meta-terphenyl trihydrochloride by 2,2',2''-trinitro-para-terphenyl (Gray and Lewis, ibid.), there was obtained 2,2',2''-triamino-para-terphenyl which was converted to its trihydrochloride by neutralising the triamine with aqueous hydrochloric acid and evaporating the resulting solution to dryness.

(B) *Preparation of 2,2',2''-triisocyanato-para-terphenyl.*—Using the procedure described in Example 1, Part C, but replacing 4,4',4''-triamino-meta-terphenyl trihydrochloride by 2,2',2''-triamino-para-terphenyl trihydrochloride, there was obtained 2,2',2''-triisocyanato-para-terphenyl.

EXAMPLE 6

A rigid polyurethane foam was prepared as follows:

A mixture of 100 g. of G-435 DM (an α-methylglucoside-propylene oxide adduct, equivalent weight 128; Olin Mathieson), 2 g. of an organosilicone surfactant (Dow Corning 201), 2 g. of N,N,N',N'-tetramethyl-1,3-butanediamine and 1 g. of triethylamine was stirred and trichloromonofluoromethane was added thereto until an increase in weight of 34 g. was attained. To the resulting mixture was added quickly with vigorous stirring 105 g. of 4,4',4''-triisocyanato-meta-terphenyl (prepared as described in Example 1) and the mixture so obtained was poured into an open mould and allowed to foam freely. The rise was complete in approximately 90 seconds. The resulting foam was allowed to cure at room temperature (ca. 25° C.) for 24 hours. The foam so obtained had a density of 1.9 lbs. per cu. ft. and possessed high strength and insulating properties.

Similar foams having substantially the same properties as described above are obtained using the above procedure but replacing 4,4',4''-triisocyanato-meta-terphenyl by 4,2',4''-triisocyanato-para-terphenyl, 2,2',4''-triisocyanato-para-terphenyl, 2,3',4''-triisocyanato-para-terphenyl, and 2,2',2''-triisocyanato-para-terphenyl.

I claim:

1. A compound having the formula:

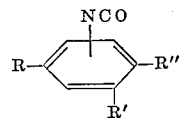

wherein R represents a member selected from the group consisting of o-isocyanatophenyl and p-isocyanatophenyl, one of the groups R' and R'' represents hydrogen, and the other of the groups R' and R'' represents a member selected from the group consisting of o-isocyanatophenyl and p-isocyanatophenyl.

2. 4,4',4''-triisocyanato-meta-terphenyl.
3. 4,2',4''-triisocyanato-para-terphenyl.
4. 2,2',4''-triisocyanato-para-terphenyl.
5. 2,3',4''-triisocyanato-para-terphenyl.
6. 2,2',2''-triisocayanto-para-terphenyl.

References Cited

UNITED STATES PATENTS 3,294,713  12/1966  Hudson et al. ———— 260—2.5

CHARLES B. PARKER, *Primary Examiner.*

D. H. TORRENCE, *Assistant Examiner.*